US011080739B2

(12) United States Patent
Setchell et al.

(10) Patent No.: US 11,080,739 B2
(45) Date of Patent: Aug. 3, 2021

(54) DATA TRANSLATOR

(71) Applicant: R.J. Reynolds Tobacco Company, Winston-Salem, NC (US)

(72) Inventors: Joel R. Setchell, Advance, NC (US); Erika Leigh Carney, Huntersville, NC (US); James Hartsell, Charlotte, NC (US); Mark James Rickert, Charlottte, NC (US); Corey Douglas Daniels, Charlotte, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 182 days.

(21) Appl. No.: 14/261,485

(22) Filed: Apr. 25, 2014

(65) Prior Publication Data

US 2015/0310474 A1   Oct. 29, 2015

(51) Int. Cl.
| | |
|---|---|
| *G06Q 30/02* | (2012.01) |
| *G06Q 20/38* | (2012.01) |
| *G06Q 20/32* | (2012.01) |
| *G06Q 20/20* | (2012.01) |
| *G07G 1/00* | (2006.01) |

(Continued)

(52) U.S. Cl.
CPC ....... *G06Q 30/0225* (2013.01); *G06K 7/1404* (2013.01); *G06Q 20/20* (2013.01); *G06Q 20/3274* (2013.01); *G06Q 20/387* (2013.01); *G06Q 30/0207* (2013.01); *G06Q 30/06* (2013.01); *G07G 1/0045* (2013.01); *H04L 67/10* (2013.01)

(58) Field of Classification Search
None
See application file for complete search history.

(56) References Cited

U.S. PATENT DOCUMENTS

| 5,698,599 A | 12/1997 | Subbiah |
| 6,336,099 B1 | 1/2002 | Barnett et al. |

(Continued)

FOREIGN PATENT DOCUMENTS

| EP | 1808087 | 7/2007 |
| EP | 2550879 | 1/2013 |

(Continued)

OTHER PUBLICATIONS

Tobacco Control Legal Consortium "Tobacco Coupon Regulations and Sampling Restrictions". Mar. 2011. [retrieved from internet on Mar. 26, 2021] <URL: https://publichealthlawcenter.org/sites/default/files/resources/tclc-guide-tobcouponregsandsampling-2011.pdf> (Year: 2011).*

(Continued)

*Primary Examiner* — Bion A Shelden
(74) *Attorney, Agent, or Firm* — Brinks Gilson & Lions

(57) ABSTRACT

Systems and methods are provided for translation and validation of representations of data for use in retail transactions. The systems and methods may be implemented by a device including at least one circuit. In some implementations a device may comprise a scanning component and a display component. The scanning component may be operable to capture data corresponding to a first representation of the data. The screen may be operable to display a second representation of the data. The data may correspond to coupon data associated with the sale of a product.

8 Claims, 7 Drawing Sheets

(51) Int. Cl.
*G06Q 30/06* (2012.01)
*G06K 7/14* (2006.01)
*H04L 29/08* (2006.01)

(56) References Cited

U.S. PATENT DOCUMENTS

| | | | |
|---|---|---|---|
| 6,862,575 | B1 | 3/2005 | Anttila et al. |
| 6,932,270 | B1 | 8/2005 | Fajkowski |
| 7,257,545 | B1 | 8/2007 | Hung |
| 7,433,826 | B2 | 10/2008 | Korosec |
| 7,606,401 | B2 | 10/2009 | Hoffman et al. |
| 7,708,189 | B1 | 5/2010 | Cipriano |
| 7,753,056 | B2 | 7/2010 | Borschke et al. |
| 7,769,638 | B1 | 8/2010 | Millett et al. |
| 7,827,410 | B2 | 11/2010 | Korosec |
| 7,836,897 | B2 | 11/2010 | Borschke et al. |
| 8,046,257 | B2 | 10/2011 | Wane et al. |
| 8,090,355 | B2 | 1/2012 | Rissanen |
| 8,270,578 | B2 | 9/2012 | Poniatowski |
| 8,280,766 | B2 | 10/2012 | Higgins et al. |
| 8,280,768 | B2 | 10/2012 | Davis |
| 8,285,588 | B2 | 10/2012 | Postrel |
| 8,301,494 | B2 | 10/2012 | Wills |
| 8,413,884 | B2 * | 4/2013 | Lim .................. G06F 16/9554 235/375 |
| 8,464,726 | B2 | 6/2013 | Sebastian |
| 8,469,035 | B2 | 6/2013 | Banerjee |
| 2004/0243519 | A1 * | 12/2004 | Perttila .............. G06Q 20/425 705/75 |
| 2006/0061488 | A1 * | 3/2006 | Dunton .............. G06Q 10/109 340/988 |
| 2006/0255149 | A1 * | 11/2006 | Retter ................. G06K 7/1095 235/462.41 |
| 2008/0065488 | A1 | 3/2008 | Schwagmann et al. |
| 2008/0077484 | A1 * | 3/2008 | Main ................. G06Q 30/0221 705/14.17 |
| 2008/0077486 | A1 | 3/2008 | Davis et al. |
| 2008/0097851 | A1 * | 4/2008 | Bemmel ............ G06Q 30/0236 705/14.36 |
| 2008/0167991 | A1 | 7/2008 | Carlson et al. |
| 2009/0024477 | A1 | 1/2009 | Kramer et al. |
| 2009/0026255 | A1 * | 1/2009 | Besecker ............ G06Q 20/208 235/375 |
| 2009/0029766 | A1 | 1/2009 | Lutnick et al. |
| 2009/0032584 | A1 | 2/2009 | Yamada et al. |
| 2009/0076912 | A1 | 3/2009 | Rajan et al. |
| 2009/0156180 | A1 * | 6/2009 | Slavin .............. G06K 19/06028 455/414.1 |
| 2009/0276307 | A1 | 11/2009 | Griffith et al. |
| 2010/0294289 | A1 | 11/2010 | Dube et al. |
| 2011/0072039 | A1 | 3/2011 | Tayloe |
| 2011/0082729 | A1 | 4/2011 | Carvallo et al. |
| 2011/0213652 | A1 | 9/2011 | Gillen et al. |
| 2011/0218868 | A1 * | 9/2011 | Young ............... G06Q 20/045 705/16 |
| 2011/0246284 | A1 * | 10/2011 | Chaikin ............... G06Q 30/00 705/14.38 |
| 2011/0259351 | A1 | 10/2011 | Beroth et al. |
| 2011/0296502 | A1 | 12/2011 | Peretti |
| 2011/0296659 | A1 | 12/2011 | Coleman, Sr. et al. |
| 2011/0303511 | A1 | 12/2011 | Brinkley et al. |
| 2012/0000477 | A1 | 1/2012 | Sebastian et al. |
| 2012/0010931 | A1 | 1/2012 | Mehra et al. |
| 2012/0024304 | A1 | 2/2012 | Sebastian |
| 2012/0029994 | A1 | 2/2012 | Barkan |
| 2012/0030024 | A1 | 2/2012 | Bakker |
| 2012/0037546 | A1 | 2/2012 | Dixon et al. |
| 2012/0042885 | A1 | 2/2012 | Stone |
| 2012/0055494 | A1 | 3/2012 | Hunt et al. |
| 2012/0067944 | A1 | 3/2012 | Ross |
| 2012/0078736 | A1 * | 3/2012 | Denzer ............... G06Q 20/20 705/16 |
| 2012/0089514 | A1 | 4/2012 | Kraemling et al. |
| 2012/0091194 | A1 * | 4/2012 | Borucki .............. G06Q 10/02 235/375 |
| 2012/0096514 | A1 | 4/2012 | Tuscano et al. |
| 2012/0120229 | A1 | 5/2012 | Brantley et al. |
| 2012/0123847 | A1 | 5/2012 | Wane et al. |
| 2012/0136698 | A1 | 5/2012 | Kent |
| 2012/0136707 | A1 | 5/2012 | Chang et al. |
| 2012/0136712 | A1 | 5/2012 | Chang et al. |
| 2012/0138073 | A1 | 6/2012 | Cantrell et al. |
| 2012/0138074 | A1 | 6/2012 | Cantrell et al. |
| 2012/0141648 | A1 | 6/2012 | Morton et al. |
| 2012/0185321 | A1 | 7/2012 | Lal |
| 2012/0209673 | A1 | 8/2012 | Park |
| 2012/0276354 | A1 * | 11/2012 | Thompson ............. C08J 5/128 428/217 |
| 2013/0007041 | A1 | 1/2013 | Comparelli et al. |
| 2013/0007849 | A1 * | 1/2013 | Coulter ............... G06F 21/313 726/4 |
| 2013/0019888 | A1 | 1/2013 | Tsuruizumi et al. |
| 2013/0133675 | A1 | 5/2013 | Shinozaki et al. |
| 2013/0146075 | A1 | 6/2013 | Poget |
| 2013/0191205 | A1 | 7/2013 | Harkless, II et al. |
| 2013/0206150 | A1 | 8/2013 | Duggins et al. |
| 2013/0282475 | A1 * | 10/2013 | Kim .................... H04W 4/14 705/14.39 |
| 2013/0311255 | A1 * | 11/2013 | Cummins .......... G06Q 30/0235 705/14.13 |
| 2014/0149197 | A1 * | 5/2014 | James ............... G06Q 30/0225 705/14.26 |
| 2014/0156376 | A1 * | 6/2014 | Sellers .................. G06Q 20/20 705/14.38 |
| 2014/0207552 | A1 * | 7/2014 | Blosser .............. G06Q 30/0239 705/14.26 |
| 2014/0222545 | A1 * | 8/2014 | Hajji .................... G06Q 20/20 705/14.38 |
| 2014/0297441 | A1 * | 10/2014 | Thams .............. G06K 19/06028 705/23 |
| 2015/0248663 | A1 * | 9/2015 | Meere ................ G06Q 20/3274 705/17 |

FOREIGN PATENT DOCUMENTS

| | | |
|---|---|---|
| EP | 2 701 099 A1 | 2/2014 |
| JP | 2005078323 A | 3/2005 |
| JP | 2005328179 | 11/2005 |
| JP | 2007299369 A | 11/2007 |
| JP | 2013041453 A | 2/2013 |
| WO | WO 2012/164077 | 12/2012 |
| WO | WO 2013/088405 | 7/2013 |
| WO | WO 2013/098380 | 7/2013 |
| WO | WO 2013/098410 | 7/2013 |
| WO | WO 2013/104914 | 7/2013 |

OTHER PUBLICATIONS

Japanese Office Action and English Translation for Japanese Application No. 2016-564121, dated Apr. 12, 2019, 13 pgs.
Inoue Ryuichiro, Proposal for computerization of internal voucher using electronic paper (DMS), Monthly magazine, Automatic Recognition, Japan, Japan Industrial Publishing Co., Ltd., May 10, 2010, vol. 23, No. 6, pp. 16 to 18, and English Translation.

* cited by examiner

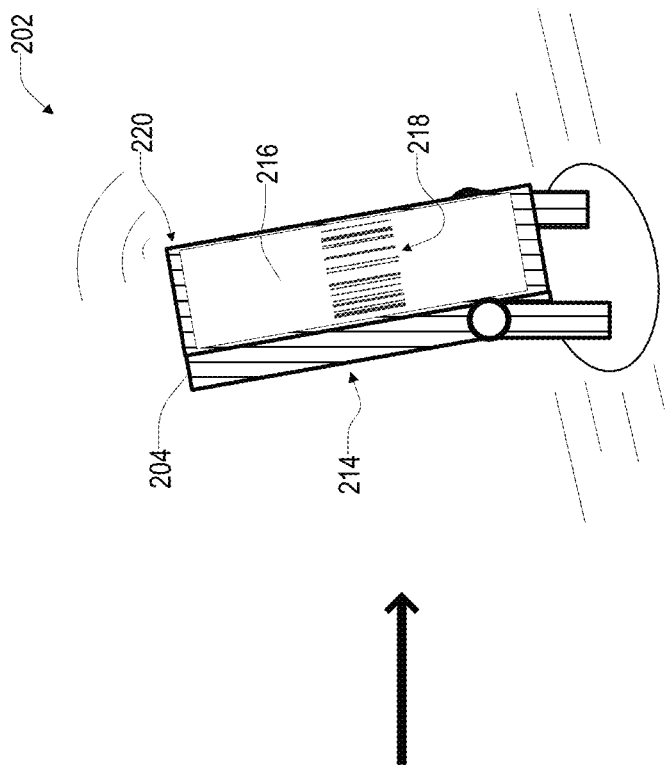
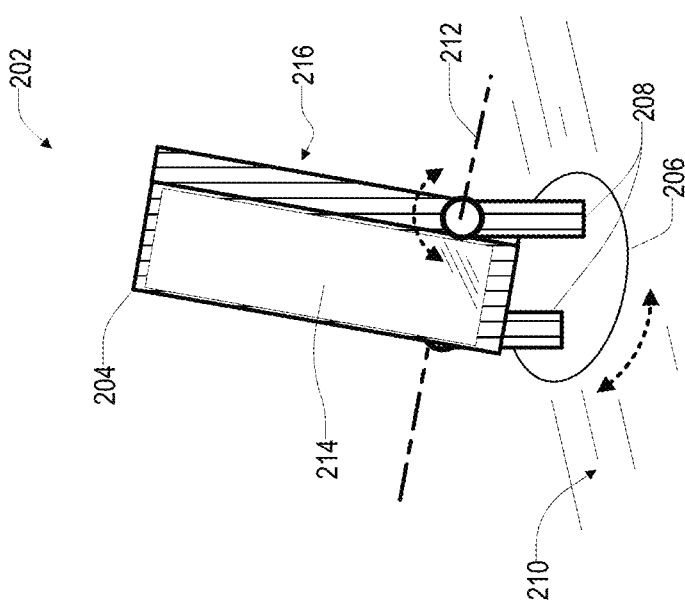
Figure 2A
Figure 2B

DATA TRANSLATOR

BACKGROUND

The present disclosure generally relates to a system and method for translation of a visual representation of data.

SUMMARY

The present disclosure provides systems and methods for translation and validation of representations of data for use in retail transactions. In some implementations a device may comprise a reader and a display component. The reader may be operable to capture data corresponding to a first representation of the data. The screen may be operable to display a second representation of the data. The second representation of the data may be generated by a processor in communication with the reader and the screen. The data may correspond to coupon data associated with the sale of a product. In some implementations, the first representation may comprise a matrix barcode and the second representation may comprise a linear barcode. The reader may be mounted in a body and configured to face a first direction. The screen may be mounted in the body and configured to face a second direction.

In some implementations, a method may be provided for the translation of data. The method may comprise capturing a first representation of a coupon and determining a code to identify the coupon. The code may be verified in order to determine if the coupon is valid. Verifying the code may comprise communicating with a database via a network connection to identify a validity of the coupon. Usage information corresponding to the usage of a coupon may also be communicated to the database. The usage information may include an identification code for a store and/or location of the usage. A second representation of the coupon may further be generated and displayed on a screen. The second representation of the coupon is configured to be compatible with a linear barcode scanner. The code corresponding to the first and second representation of the coupon may comprise an offer code corresponding to a sale offer for a product.

In some implementations, a system may comprise a reader operable to capture a first representation of data and a screen operable to display a second representation of the data. The system may further comprise a communication interface and at least one circuit. The at least one circuit may be operable to process the data from the first representation captured and/or recorded by the reader. The at least one circuit may further communicate usage information based on the data via the communication interface. The at least one circuit may further generate a second representation of at least a portion of the data and display the second representation on the screen. The at least one circuit may further be operable to communicate the data via the communication interface to identify a user account associated with the data. The user account may also be accessible through an application operating on a mobile device. Such an application on a mobile device may be implemented to generate the first representation of the data.

BRIEF DESCRIPTION OF THE DRAWINGS

The drawings described herein are for illustration purposes only and are not intended to limit the scope of the present disclosure in any way.

FIG. 2A is an example of first projected view of a device for translation of a visual representation of data;

FIG. 2B is an example of a second projected view the device of FIG. 2A;

It should be understood that throughout the drawings, corresponding reference numerals indicate like or corresponding parts and features.

DETAILED DESCRIPTION

Figure 1B:
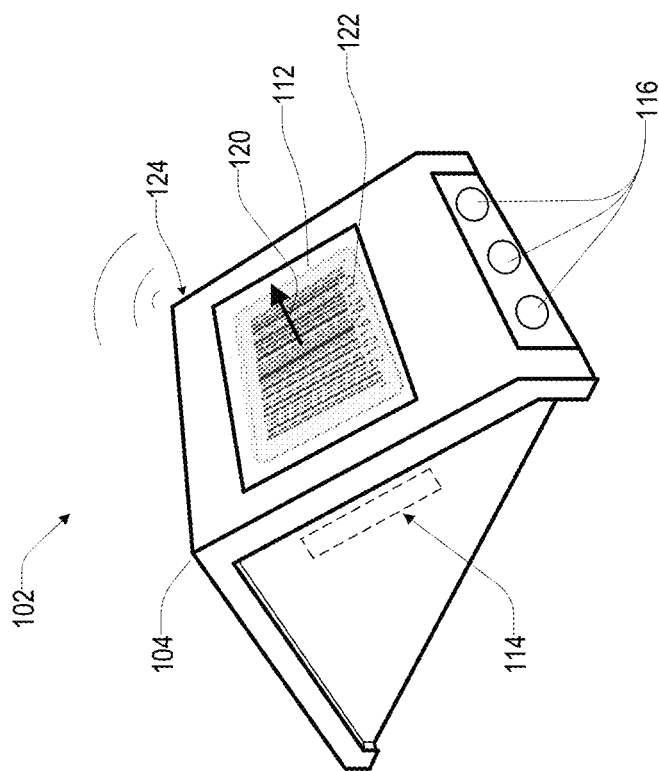
FIG. 1B is an example of a second projected view of the device of FIG. 1A.
Figure 1A:
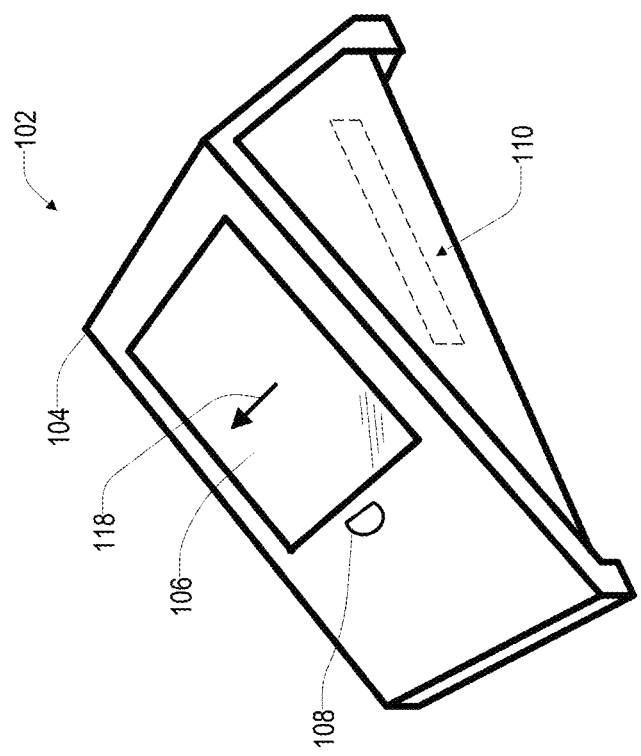
FIG. 1A is an example of a diagram representing a first projected view of a device for translation of a visual representation of data.

FIG. 1A illustrates an example of a diagram representing a device 102 for translation of a visual representation of data. The device may comprise a body 104 configured to house a reader, for example a scanning component 106. The scanning component 106 may comprise any form of device configured to scan a first visual representation of data. For example, the scanning component 106 may be configured to scan a two dimensional representation of coded data, a matrix barcode, or any graphical representation of data.

A barcode may be an optical machine readable representation of data relating to the object to which it is attached. Originally, linear barcodes systematically represented data by varying the widths and spacings of parallel lines. Barcodes have evolved into groups of symbols such as rectangles, dots, hexagons and other geometric shapes that form patterns. The symbols and patterns may vary in size and spacing in two dimensions (2D) to encode information. Although 2D systems use a variety of symbols, they are generally referred to as barcodes as well.

The scanning component 106 may comprise any form of imager or scanner operable to scan a two-dimensional representation of coded data. For simplicity, the term 2D barcode will be used throughout the disclosure when referring to a two-dimensional (2D) representation of data, such as a matrix barcode. However, it shall be understood that a scanning component, as referred to herein, may be configured to scan any 2D representation of data. A 2D representation of data may comprise a plurality of spatially aligned symbols that may represent hidden or coded information. A 2D representation of coded data may also comprise any 2D representation of data that is not readily discernible by literate humans.

The device 102 may further comprise scanner circuitry 110 and a detector 108. The device may also include an indicator that may illuminate in response to the scanning component 106 successfully reading a 2D barcode. The indicator may also be configured to signal when the scanner is ready to scan a matrix barcode. The scanner circuitry 110 may be operable to control and receive information from the scanning component 106. The scanner circuitry 110 may comprise one or more processors or circuits configured to generate a digital representation of a 2D barcode. In some implementations, contactless scanning approaches may be used, such as radio frequency, radio frequency identification (RFID), Bluetooth, Near Field Communications (NFC). In some implementations the scanning component may be operable to read a representation of data in form of any one or more of the contactless scanning approaches. The information received through the contactless scanning approaches may be processed similar to the 2D barcode discussed herein.

The detector 108 may comprise any form of sensor operable to detect an object proximate to the scanning component 106. In some implementations, the detector 108 may comprise one or more sensors of the scanning component (e.g., an imager, optical system, etc.). The detector may be configured to detect an object in proximity to an outward facing surface of the scanner component 106 with respect to the body 104. In some implementations, the detector 108 is a proximity sensor that detects when a user puts their phone or object (i.e. paper coupon) near the device to indicate to the circuit that it should begin attempting to search for readable matrix barcodes. An audible sound may emitted, and may also include a illumination response from the device.

The scanner circuitry 110 may monitor the detector for a signal or change in a signal to identify an object in proximity to the scanning component 106. In response to the signal or change in signal, the scanner circuitry 110 may initiate a scanning operation of the scanning component 106. In some implementations, a scanning operation may be also be initiated by an input from an electrical switch or a host device.

The proximity of an object detected by the detector 108 may vary. A proximity may be detected in response to a threshold of an electrical signal generated by the detector 108 and measured by the scanner circuitry 110. In some implementations, a proximity may be detected at a distance ranging from 1 to 25 cm. In exemplary implementations, a proximity may be detected in response to an object having a surface area of at least 1 square centimeter facing the scanning component 106 within 10 cm of a scanning component 106. The detection of a proximity of an object may vary widely in various implementations.

The scanning component 106 may comprise a laser scanner, an area imager, an optical imager, or any other form of scanning device operable to capture a 2D representation of data. A laser scanner may generate a laser beam and project the beam onto a 2D barcode, such as a matrix barcode. The laser line may oscillate across the 2D barcode to illuminate the 2D barcode. An optical system of the laser scanner may then capture laser light that is reflected off the 2D barcode and concentrate the light on a photo-detector. The light may then be measured by the photo-detector and converted into digital data to generate a digital representation of the 2D barcode.

An area imager may be configured to project light from a light source (e.g. light emitting diode (LED), xenon, etc.) on a target 2D barcode and measure variations in the light reflected off the 2D barcode. The light reflected from the 2D barcode may then be measured by an imager to capture digital data representing the 2D barcode. The imager may comprise a form of imaging device, for example a charge coupled device (CCD) or complementary metal-oxide-semiconductor (CMOS) sensor. The reflected light may then be measured by the imager and converted into digital data to generate a digital representation of the 2D barcode. In some implementations, a light source may be provided by an illumination from a screen of a mobile device displaying a 2D barcode. Some examples of screens of mobile devices may comprise an LCD, backlit LCD, LED screen, etc.

A second view of the device 102 is shown in FIG. 1B. The body of the device may further house a screen 112, display circuitry 114, and at least one port 116. The screen 112 may be operable to display a second representation of the data captured by the scanning component 106 and the scanner circuitry 110. The screen 112 may act as an interface with a barcode reader, for example a linear barcode reader configured for a retail transaction.

The screen 112 may be configured to face a different direction than the scanning component 106. For example, the screen 112 may face a first direction 118 and the scanning component 106 may face a second direction 120. The first direction 118 may extend along a surface vector normal to an outward facing surface of the screen 112 with respect to the body 104. The second direction 120 may extend along a surface vector normal to an outward facing surface of the scanning component 106 with respect to the body 104.

In some implementations, the first direction 118 may be directed at an angle of 45 degrees or greater from the second direction 120. In an exemplary implementation, the first direction 118 may be directed at an angle of 90 degrees or greater from the second direction 120. In operation, the angle between the first direction 118 and the second direction 120 may provide for the scanning component 106 to face a customer providing access to the scanning component 106. Once the 2D barcode is scanned, a translated representation of the data may be displayed on the screen 112 in the first direction. The translated representation of the 2D barcode, for example a linear barcode 122, may then be scanned by a sales person with a barcode reader. The barcode reader used by a sales person may, for example, not support scanning a 2D barcode. The bar code reader may comprise a linear barcode reader.

The screen 112 may comprise any form of display operable to display a second visual representation of data, for example the linear barcode 122. For example, the screen 112 may comprise a liquid crystal display (LCD), an organic light emitting diode (OLED), a flat panel display, a solid state display, a cathode ray tube (CRT), or other now known or later developed display devices for outputting determined information. In an exemplary implementation, the screen may comprise an electronic paper display, for example an e-paper or e-ink™ display. The design and particular type of display technology for the screen 112 may vary for specific implementations. A screen may be configured to generate a translated representation or second representation of the data from a 2D barcode that may be identified by a linear barcode reader. The translated representation may conform to a compatibility of a linear barcode reader.

An electronic paper (e-paper) display may comprise any form of electronic display configured to mimic the reflection of a graphical representation on paper. Some examples of e-paper displays may include gyricon displays, electrophoretic displays, electrowetting displays, electrofluidic displays, interferometric modulator displays, etc. Implementations that utilize an e-paper display as the screen 112 may provide for improved recognition by a wide range of linear barcode readers. The improved recognition may provide for the screen to generate a translated representation of the data from the 2D barcode that is compatible with a wide range of scanning devices. However, it is also contemplated herein that the e-paper display can be programmed to display other graphical representations as well. As such, the e-ink will display a linear barcode if the retailer has linear scanning capability. Additionally, for retailers that do not have scanning capability, it could display specific instructions (e.g. CASHIER: ENTER CODE 1234 IN REGISTER, or CASHIER: PRESS COUPON KEY, THEN $1). Accordingly, the use of the e-paper display is flexible.

The display circuitry 114 may be operable to control the display of the screen 112. The display circuitry 114 may be in communication with at least one circuit, for example the scanner circuitry 110. In operation, digital data may be scanned from a first representation of data (e.g. a 2D or matrix barcode) by the scanner circuitry 110. The data may then be identified by a processor in communication with the scanner circuitry 110. The digital data may then be applied to generate a second representation of the data (e.g. the linear barcode 122) by the processor.

The display circuitry 114 may further be in communication with the processor. The display circuitry may display the translated representation of the data on the screen 112. The data displayed on the screen may then be scanned by a barcode reader (e.g. linear barcode reader). The second representation of the data may represent a translated representation of the data that may be communicated to a cash register or any other form of point of sale device. For example the data may correspond to a numeric or alphanumeric code (e.g. coupon, universal purchase code (UPC), etc.) that may be identified by a point of sale device (e.g. a linear barcode reader).

The at least one port 116 may comprise a power connector, a communication port, and/or a host interface. The power connector may provide electrical current to the device 102 from an alternating current (AC) or direct current (DC) power supply. In some implementations, the device 102 may also comprise a battery to supply power for portable applications. The communication port may provide connectivity to the processor or at least one circuit of the device to data external to the device. The communication port may comprise one or more of a USB (Universal Serial Bus) port, local area network (LAN) port, serial port, parallel port, IEEE1394 Firewire™, etc. In some implementations, the communication port may be operable to communicate with a server (e.g. a coupon server) to validate a 2D barcode.

A host interface may be similarly configured to the communication port. The host interface may be operable to communicate with a point of sale device, for example a cash register, self-checkout, etc. In some implementations, the processor of the device 102 may communicate directly with a point of sale device to provide product and/or coupon information. For example, in some implementations, the device may be implemented similar to a barcode reader in communication with a cash register.

The device may further comprise a wireless transceiver 124. The wireless transceiver 124 may comprise any form of wireless communication interface. For example, the wireless transceiver may comprise one or more circuits operable to connect to a wireless interface. The wireless interface may comprise any form of wireless communication, for example a radio signal, Bluetooth, personal area networks, IEEE802.11a,b,g,n, etc. In some implementations, a wireless interface may also include a wide area network, for example CDMA, LTE, GSM and WCDMA. The wireless transceiver 124 may be operable to communicate wirelessly with a server to validate a 2D barcode. Though a variety of wireless interfaces and communications standards are discussed, a wireless interface may include other now known or later developed wireless technologies.

In some implementations, the device 102 may further be operable to store and/or identify a location. The location may represent a present location of the device 102 that may be determined by a GPS signal or a location programmed into a memory of the device 102. The location may also refer to an identification of a particular store, for example a store identification number and/or code. The location of the device 102 may then be communicated to a remote server and may identify a point of use of the device 102. For example, the location may identify a point of sale location corresponding to the usage of a 2D barcode.

FIG. 2A illustrates an example of a diagram representing a device 202 for translation of a visual representation of data. In some implementations, the device 202 may comprise a body 204 mechanically connected to a base 206 by at least one vertical support 208. The base 206 may be configured to rotate relative to a surface 210 upon which the base 206 may be rested. The body 204 may further be configured to rotate about an axis 212 corresponding to the mechanical connection of the body 204 to the at least one vertical support 208.

The configuration of the body 204, the at least one vertical support 208, and the base 206 may provide for the device 202 to rotate to various positions to facilitate the scanning and display operations discussed herein. For example, the body may rotate into a first position as depicted in FIG. 2A. The device may further be rotated to a second position as depicted in FIG. 2B. In operation, rotating from the first position to the second position may provide for the body to be aligned with a customer and a sales person during a respective scanning operation and display operation of the device 202.

Similar to the device 102 introduced in FIGS. 1A and 1B, the device 202 may comprise a scanning component 214 and a screen 216. The scanning component 214 may comprise a laser scanner, an area imager, an optical imager, or any other form of scanning device operable to capture a 2D barcode. The scanning component may be implemented by any of the implementations of the scanning component 106. The screen 216 may comprise any form of display operable to display a translated representation of data, for example a linear barcode. The screen 216 may be implemented by any of the implementations of the screen 112.

Referring to FIG. 2B, the device 202 is shown in a second position. In the second position, the screen 216 is shown displaying a translated representation of data scanned from a 2D barcode. In this example, a linear barcode 218 is displayed on the screen 216. The device may further comprise a wireless transceiver 220. The wireless transceiver 220 may be implemented similarly to the wireless transceiver 124. Though not illustrated, the device 202 may also comprise at least one port similar to the at least one port 116 of the device 102. The at least one port may comprise a power connector, a communication port, and/or a host interface.

Figures 3A, 3B:
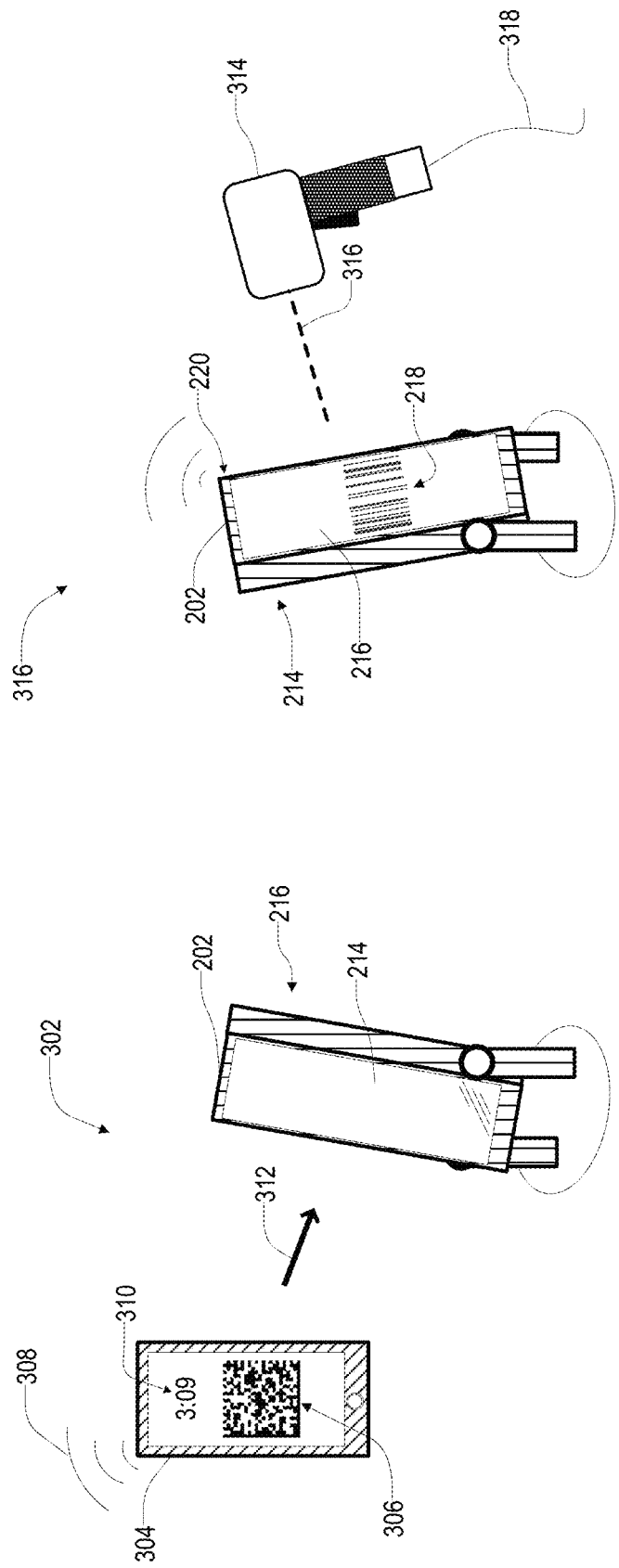
FIG. 3A is a diagram demonstrating a scanning example of a device for translation of a visual representation of data.
FIG. 3B is a diagram demonstrating a display example of a device for translation of a visual representation of data.

FIGS. 3A and 3B are diagrams demonstrating a scanning example 302 and a display example 316 of the device 202. The device 202 is shown in a scanning position or first position in FIG. 3A. In operation, a mobile device 304 may be operable to execute an application. The application may comprise an application for a specific vendor, retail store, or reward program. The application may be operable to access a coupon in the form of a 2D barcode, such as matrix barcode 306 via a wireless interface 308. The wireless interface may be implemented similar to those discussed in reference to the wireless transceivers 124 and 220. Though the examples of FIGS. 3A and 3B describe the device 202, the example is similarly applicable to the device 102.

The mobile device 304 may comprise any form of device that may be configured to store and display a matrix barcode. Some examples of mobile devices may include a phone, smart phone, tablet, PDA, laptop, an electronic reading device (e-reader), etc. In an exemplary implementation, an application running on a mobile device may be configured to communicate with a remote database via a communication interface and/or wireless interface. In this way, availability and usage information for a particular matrix barcode may be updated to the mobile device 304 from the remote database. Further, it is contemplated herein that the scanner may read from various mediums and is not confined to coupons on a mobile device. The scanner may also read matrix barcodes on paper, plastic etc. More details related to updating and tracking coupon usage are discussed in reference to FIG. 4.

The application operating on the mobile device 304 may display the matrix barcode 306 for a limited period of time as shown by a countdown timer 310. In operation, the mobile device 304 may be aligned 312 with the scanning component 214 of the device 202 such that the matrix barcode 306 faces the scanning component 214. A scanning operation of the scanning component 214 may then be activated manually in response to an input causing the scanning component 214 to scan the matrix barcode 306. In some implementations, a detector (e.g. the detector 111) may detect a proximity of an object and initiate a scanning operation of the scanning component 214.

Once the matrix barcode 306 is scanned, a processor of the device 202 may identify coded data corresponding to the matrix barcode 306. In some implementations, the device may be operable to access the remote server via the wireless interface 220 to verify the validity of the coded data. In some examples, the device may also be operable to verify the validity of the coded data via a communication port operable to access a remote server, for example the at least one port 116. A verification step to determine the validity of a matrix barcode may be advantageous in that it may provide for limited usage of a particular matrix barcode. The verification step may further serve to report usage of a coupon in the form of a matrix barcode to a vendor, retail store, reward program, etc. The usage may be reported to a server or a coupon server through the internet or a private network.

In response to validation of the coded data corresponding to the matrix barcode, the coded data may be translated and generated in a translated representation. The translated representation may comprise a format that may be identified by a scanning device, for example a linear barcode scanner 314. The device 202 may then be positioned in a second position 316. In the second position 316, the device 202 may be aligned with a sales person such that the barcode scanner 314 may target the display 216. The barcode scanner 314 may then be activated and scan 316 the translated representation of the coded data. In the translated form, the coded data may be identified by the barcode scanner 314. The coded data may then be decoded and communicated with a cash register or other point of sale device of a retailer via a host interface 318 to complete a discount transaction.

Figure 4:
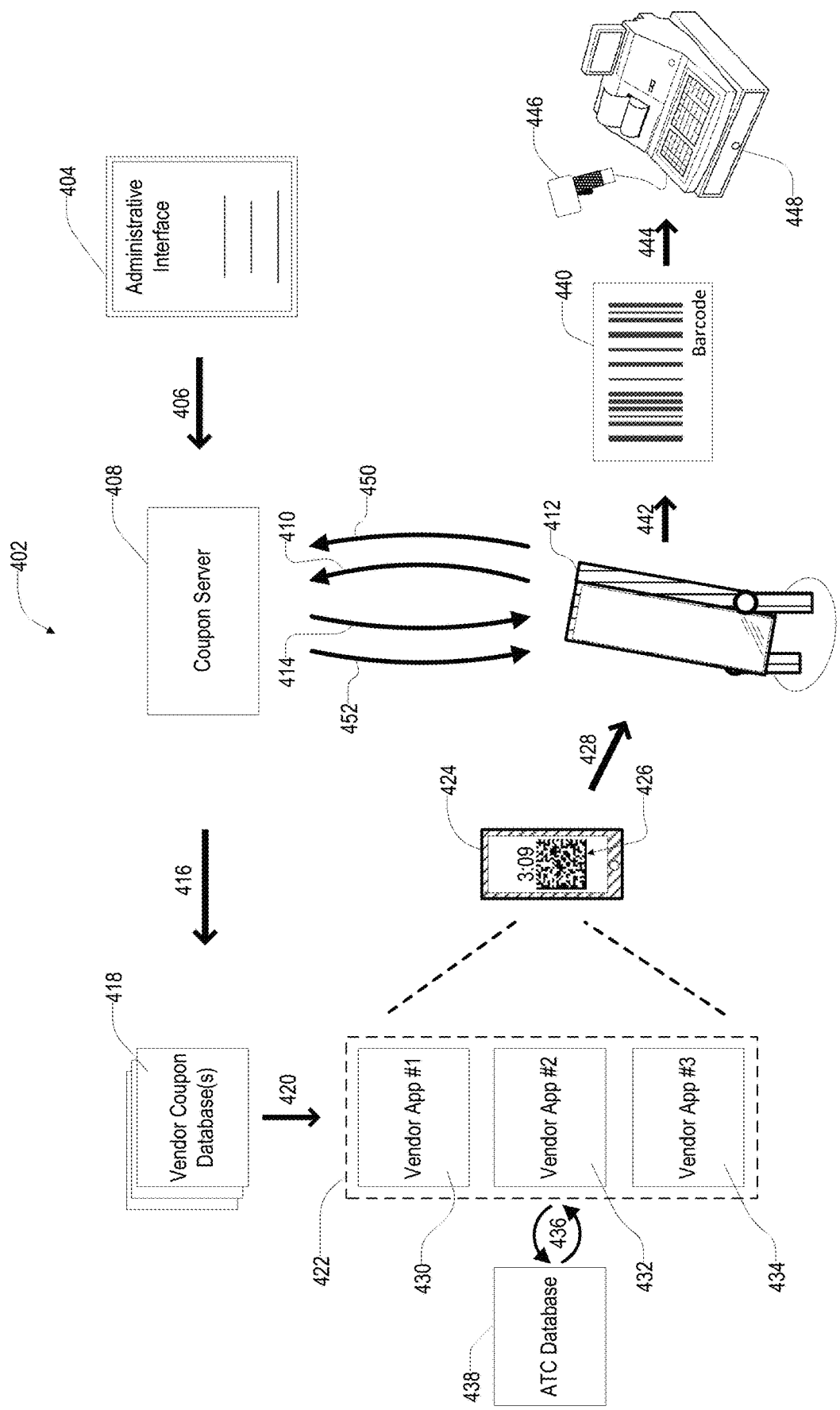
FIG. 4 is an example of an environment for a system for translation of a visual representation of data.

FIG. 4 is an example of an environment 402 for a system for translation of a visual representation of data. An administrative interface 404 may be configured to access and update information 406 on a coupon server 408. The coupon server 408 may be configured to store and update any form of information related to the sale of goods and retail transactions. For example, the coupon server may be configured to store and track information corresponding to special offers, rewards, coupons, etc. The coupon server 408 may further be operable to update and validate usage information including a quantity of uses of a coupon by a particular customer and an expiration of a particular coupon.

Coupon usage information 410 may be updated to the coupon server 408 through a communication link with each of a plurality of devices 412. For example, usage information for a coupon may be updated through the communication link in response to a discount transaction being processed by one of the plurality of devices 412. The coupon server 408 may also be operable to identify the validity of a particular coupon and communicate verification information 414 of the coupon's validity to one of the plurality of devices 412. In some implementations, one of the plurality of devices 412 may wait for verification information 414 from the coupon server before displaying a translated representation of a matrix barcode. In this way, an operator of the administrative interface 404 may control usage of a coupon represented as a matrix barcode.

The plurality of devices 412 may be similar to the devices 102 and 202 and may correspond to point of sale devices. Each of the plurality of devices 412 may communicate coupon usage information 410 corresponding to coupons and special offers for retail transactions. The coupon usage information 410 may be communicated to the coupon server 408 through a wireless interface and/or a communication interface. Examples of wireless interfaces and communication interfaces are discussed in reference to FIG. 1, for example the at least one port 116 and the wireless transceiver 124.

The coupon server 408 may further be configured to communicate and update usage information 416 to at least one vendor coupon database 418. The information may be updated in response to transactions reported by each of the plurality of devices 412. The at least one vendor coupon database 418 may further update coupon, special offer, and reward program information (hereinafter coupon information 420) for at least one vendor application 422. The at least one vendor application 422 may receive updated coupon information 420 (e.g. removing expired coupons and adding new offers) from the at least one vendor application 422 through the vendor coupon database 418.

A vendor application may be configured to operate on a mobile device 424. Some examples of mobile devices may include a phone, smart phone, tablet, PDA, laptop, an electronic reading device (e-reader), phablets, wearable computers, (e.g. glasses or wristwatches) or other computing devices with similar capabilities etc. In some implementations, the vendor application may be configured to access a user account via a wireless interface or other communication interface. The user account may be accessed through a user login in the vendor application. A user account may also be authenticated and accessed for the mobile device 424. The authentication may be linked to a serial number of a mobile device and/or a sim card for a mobile device. In some implementations, coupons and/or matrix barcodes may be provided through other mediums, for example email, SMS Text, paper, plastic, etc.

Once a user account is accessed by a vendor application on the mobile device 424, coupon information 420 corresponding to a particular user account may be updated from the vendor coupon database 418. By accessing a user account, coupon information generated in a 2D barcode, such as matrix barcode 426 may also include user account information. User account information coded in the matrix barcode may be identified when the matrix barcode is scanned 428 by a device of the plurality of devices 422. The device of the plurality of devices 422 may then report usage information for a particular user and update the coupon usage information 410 to the coupon server 408 for a discount transaction. By accessing a user account, usage information may be controlled and tracked for a user account in response to a discount transaction.

The coupon server 408 may further validate the verification information 414 for the user account and update usage information 416 in the vendor coupon database 418. The vendor coupon database 418 may then update coupon usage, availability, and validity (e.g. coupon information 420) in the at least one vendor application 422. In this way, a user of the mobile device 424 may be notified of available coupons, expired coupons, and/or coupons reaching a usage limit in the at least one vendor application 422. A usage limit may be set to any quantity, value, offer, expiration date and/or other limitation through the administrative interface 404.

In some implementations, the mobile device 424 may be operable to execute and/or access a plurality of vendor applications. The number of vendor applications available to a mobile device may be unlimited and may depend on the compatibility and/or capacity of a mobile device. For example, the mobile device 424 may be configured to access a first vendor application 430, a second vendor application 432, and a third vendor application 434. Each of the vendor applications 430, 432, and 434 may be updated by the at least one vendor coupon database to adjust coupon information 420 corresponding to an availability of at least one coupon. The plurality of vendor applications operating on the mobile device 424, may provide for customized user interfaces, options, features, and accessibility to be provided by a plurality of different vendors through the at least one vendor coupon database 418. The system may have wireless (such as Bluetooth or similar) communication capabilities. As such, the system could send an offer (via email, text, app) directly to a user's phone based on proximity (e.g. geolocation) to the device. (e.g. Driving within 2 miles of a system triggers an offer to be sent to a particular user.

In some instances, a coupon may be a message from a source, such as a manufacturer, retailer, wholesaler, etc, to a consumer including one or more of a discount, reward, promotion, incentive, or offer normally redeemed with a retailer for goods or services requiring action on the part of the user. The action may include purchase of an item or providing certain consumer data of the user. The consumer data may include information identifying the user, the user's finances, the user's preferences, and/or the user's purchasing habits. The consumer data may also include the time, date, place, and price related to the purchase. For example, the electronic coupon may be access to a particular offer, such as a discount or special price on a product, good, or service. The product may be a consumer product, such as drinks (e.g. water or soda), snacks, tobacco products, confectionaries, etc. The consumer products may be offered to the public and coupons redeemed through various retailers, including for example convenience stores. In some instances an electronic coupon may be a link to a website, an email, a text, or available in other electronic mediums, further, electronic coupon may be delivered through an electronic medium and printed for redemption purposes. The electronic coupon may be non-paper, digital, coded (e.g. bar coded), scrambled, in received message form, in the form of an ID entered by a clerk, scanned, or provided on an RFID, memory stick, electronic image, or other media. The electronic coupon may be redeemed during purchase. A purchase may include tender of currency or barter for acquisition of a good and service.

Some coupons, special offers, and rewards programs may only be made available to users over a specific age. For example, special offers related alcohol, tobacco, and other age restricted material should not be made accessible to minors (e.g. individuals under a specific age by state or federal regulation). The offers may be for one or more of the various types of tobacco products described below.

Cigarettes, cigars and pipes are popular smoking articles that employ tobacco in various forms. For example, a traditional type of cigarette has a substantially cylindrical rod-shaped structure and includes a charge, roll or column of smokable material, such as shredded tobacco (e.g., in cut filler form), surrounded by a paper wrapper, thereby forming a so-called "smokable rod", "tobacco rod" or "cigarette rod." Normally, such a cigarette has a cylindrical filter element aligned in an end-to-end relationship with the tobacco rod. Preferably, a filter element comprises plasticized cellulose acetate tow circumscribed by a paper material known as "plug wrap." Preferably, the filter element is attached to one end of the tobacco rod using a circumscribing wrapping material known as "tipping paper." It also has become desirable to perforate the tipping material and plug wrap, in order to provide dilution of drawn mainstream smoke with ambient air. Descriptions of cigarettes and the various components thereof are set forth in Tobacco Production, Chemistry and Technology, Davis et al. (Eds.) (1999); which is incorporated herein by reference. A traditional type of cigarette is employed by a smoker by lighting one end of the tobacco rod. The smoker then receives mainstream smoke into his/her mouth by drawing on the opposite end (e.g., the filter end or mouth end) of the burning cigarette.

Through the years, efforts have been made to improve upon the components, construction and performance of smoking articles that require combustion of tobacco for smoke generation. Many of the improvements that have been proposed purportedly attempt to provide the sensations associated with cigarette, cigar or pipe smoking, but without delivering considerable quantities of incomplete combustion and pyrolysis products that result from burning tobacco. See, for example, the various references in the cited in the background art that is discussed in U.S. Pat. No. 7,753,056 to Borschke et al.; which is incorporated herein by reference.

Certain types of cigarettes that employ carbonaceous fuel elements have been commercially marketed under the brand names "Premier" and "Eclipse" by R. J. Reynolds Tobacco Company. See, for example, those types of cigarettes described in Chemical and Biological Studies on New Cigarette Prototypes that Heat Instead of Burn Tobacco, R. J. Reynolds Tobacco Company Monograph (1988) and Inhalation Toxicology, 12:5, p. 1-58 (2000). Additionally, a similar type of cigarette recently has been marketed in Japan by Japan Tobacco Inc. under the brand name "Steam Hot One." Furthermore, various types of smoking products incorporating carbonaceous fuel elements for heat generation and aerosol formation recently have been set forth in the patent literature. See, for example, the types of smoking products proposed in U.S. Pat. No. 7,836,897 to Borschke et al.; U.S. Pat. No. 8,469,035 to Banerjee et al. and U.S. Pat. No. 8,464,726 to Sebastian et al.; US Pat. Pub. Nos. 2012/0042885 to Stone et al.; 2013/0019888 to Tsuruizumi et al; 2013/0133675 to Shinozaki et al. and 2013/0146075 to Poget et al.; PCT WO Nos. 2012/0164077 to Gladden et al.; 2013/098380 to Raether et al.; 2013/098405 to Zuber et al.;

2013/098410 to Zuber et al. and 2013/104914 to Woodcock; EP 1808087 to Baba et al. and EP 2550879 to Tsuruizumi et al.; which are incorporated herein by reference.

In recent years, there have been proposed numerous smoking products, flavor generators and medicinal inhalers that utilize electrical energy to heat and vaporize volatile materials, or otherwise attempt to provide many of the sensations of smoking, without burning tobacco to any significant degree. See, for example, the various types of aerosol generation devices set forth in the background art described in U.S. Pat. No. 7,726,320 to Robinson et al., and U.S. patent application Ser. No. 13/826,929, filed Mar. 14, 2013, to Ampolini et al. and Ser. No. Ser. No. 14/011,992, filed Aug. 28, 2013, to Davis et al.; which are incorporated herein by reference.

Tobacco also may be enjoyed in a so-called smokeless form. Particularly popular smokeless tobacco products are employed by inserting some form of processed tobacco or tobacco-containing formulation into the mouth of the user. See for example, the types of representative smokeless tobacco products, as well as the various smokeless tobacco formulations, ingredients and processing methodologies, referenced in the background art set forth in U.S. Pat. Pub. Nos. 2011/0303511 to Brinkley et al. and 2013/0206150 to Duggins et al.; which are incorporated herein by reference.

In such cases, at least one vendor application 422 may be configured to identify and authenticate a user and/or user account 436 in a database 438. The database may provide an age verification for a user and/or user account. Vendor applications providing access to age restricted substances or materials may be verified as a safety precaution to ensure that only adults have access to such materials.

As stated previously, a matrix barcode may be scanned 428 to initiate a discount transaction. Once the matrix barcode 426 has been scanned 428 by the device 412, a linear barcode 440 may be generated and displayed 442 on a screen of the device 412. The linear barcode 440 may then be scanned 444 by a barcode reader 446. The barcode reader 446 may communicate coupon data to a cash register 448 to complete a discount transaction.

In addition to the tracking and data capture discussed above, implementing the device 412 in a retail location may have significant benefits for retailers. For example, a retailer may report coupon usage information 450 for redemption purposes. In traditional coupon and special offer transactions, a retailer may be required to collect and mail coupons to a manufacturer for redemption. However, by implementing the device 412 in a retail location, a retailer may update coupon usage information 450 to the coupon server 408 for redemption. Implementing the device 412 in a retail location may provide for an efficient system for coupon redemption.

Other benefits for retailers may include security and protection against fraud related to coupon usage. The device 412 was previously discussed as being operable to verify coupon or special offer information through the verification information 414 from the coupon server 408. Further security measures may also include downloading a barcode 452 configured for a retail location or a particular retail chain. The barcodes provided to a particular retail location may be less susceptible to fraud due to the codes being specific to a location or retail chain. By providing incentives, such as efficient redemption of coupons and added security, the device 412 may provide significant benefits for retailers.

The coupon server 408 may further be operable to track any form of information related to sales transactions. For example, the coupon server may store and track information related to net sales, geographic information, demographics, etc. The information may be valuable in determining the effectiveness of a particular offer or coupon in a specific retail location, retail sales region, or for a retail chain.

Figure 5A:
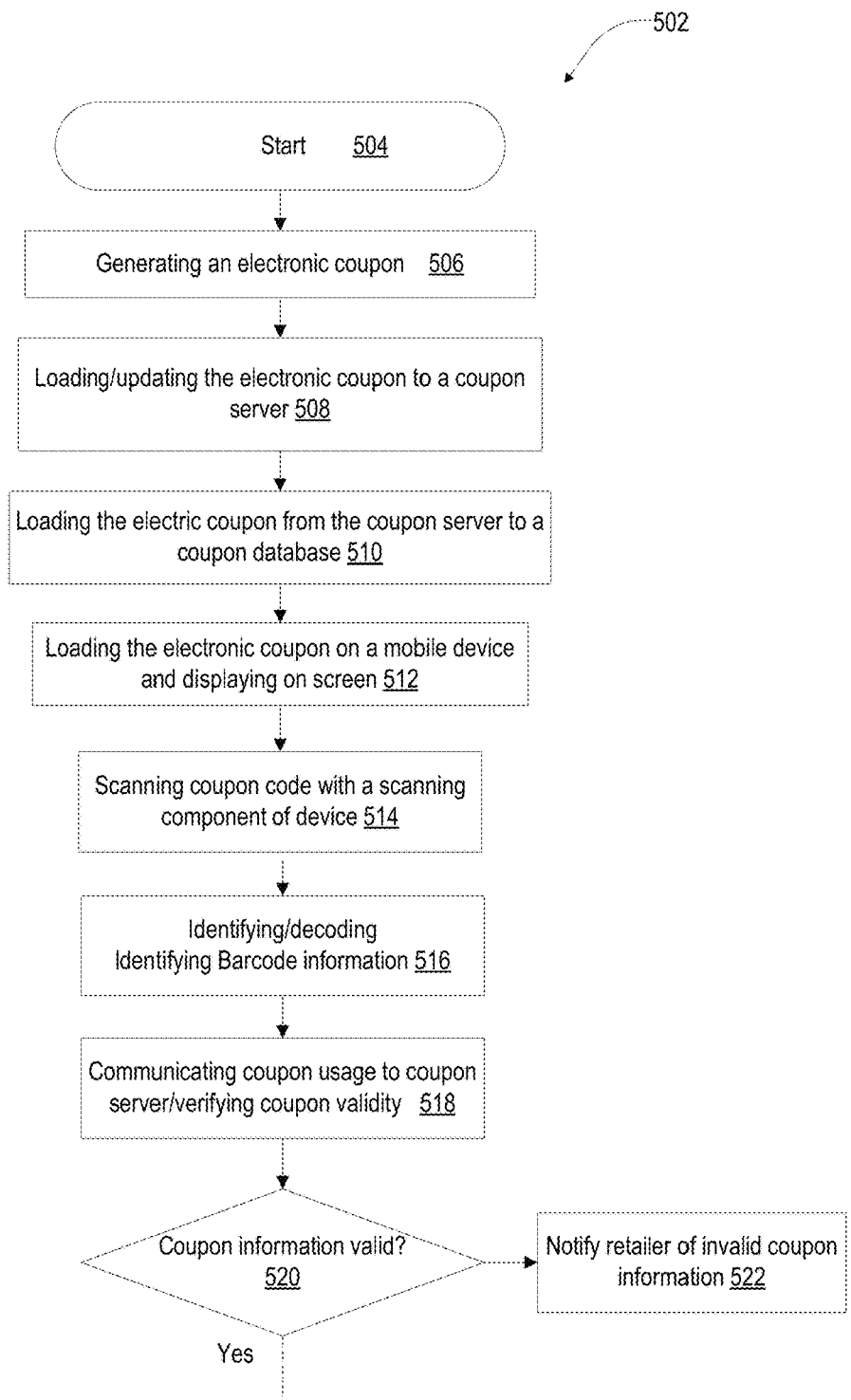
FIG. 5A is an example of a method for translating a visual representation of data.
Figure 5B:
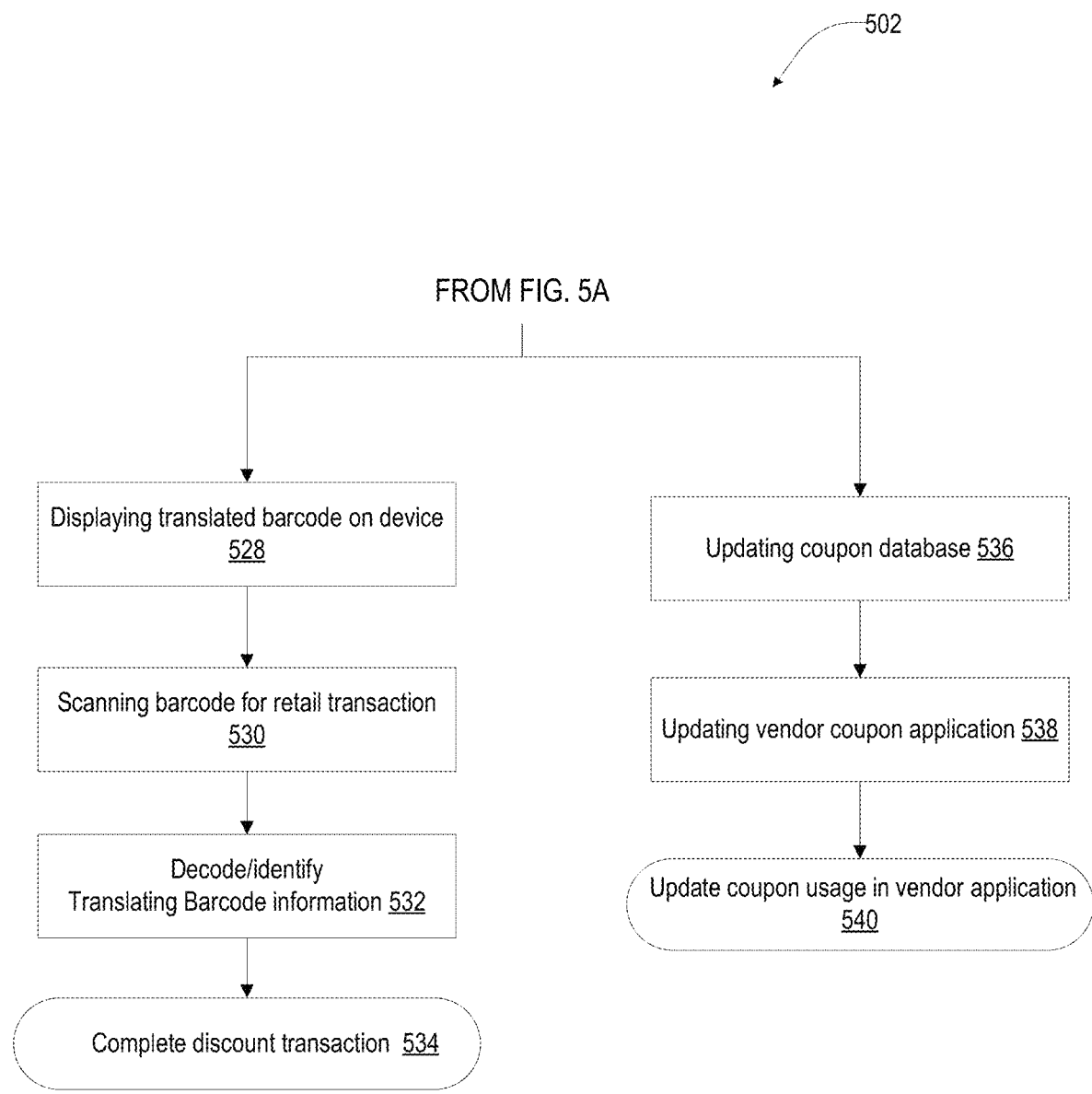
FIG. 5B is an example of a method for translating a visual representation of data continued from FIG. 5A.

FIGS. 5A and 5B demonstrate an example of a method 502 for translating a visual representation of data. The method 502 may relate to a similar environment 402 as discussed in reference to FIG. 4. In relation to the environment, the method 502 may relate to events that may occur in various orders in response to various inputs from an administrative interface, a point of sale device (e.g. devices 102, 202, or 412), and other inputs related to the various applications, databases, and servers. In some implementations, the method 502 may start in response to an input to the administrative interface (504).

In response to the input, the administrative interface may generate an electronic coupon, special offer, reward incentive, etc. (hereinafter electronic coupon) (506). The electric coupon may comprise a single use coupon, unlimited use coupon, or in some cases, may relate to a coupon for a particular user account. The electronic coupon may be loaded/updated to a coupon server (508). From the coupon server, the electronic coupon may be loaded to a vendor coupon database (510). For example, the electronic coupon may be access to a particular offer, such as a discount or special price on a product, good, or service. In some instances an electronic coupon may be a link to a website, an email, a text, or available in other electronic mediums, further, electronic coupon may be delivered through an electronic medium and printed for redemption purposes. The electronic coupon may be redeemed during purchase. A purchase may include tender of currency or barter for acquisition of a good and service.

Once the electronic coupon is loaded to the vendor coupon database, the electronic coupon may be accessed by a user on a mobile device via a vendor application. The electronic coupon may be loaded to the mobile device and displayed on a screen of the mobile device in response to an input (512). The input may comprise a user input or request from a user to a vendor application to view an electronic coupon. The electronic coupon may be displayed on the screen in the form of a 2D barcode, such as matrix barcode, and may include additional information related to the user or a specific user account coded in the 2D barcode. With the 2D barcode displayed on screen of the mobile device, the matrix barcode may be scanned by a scanning component of a point of sale device (514).

Once scanned, the point of sale device may identify and decode coupon information from the 2D barcode, such as matrix barcode (516). The coupon information may then be communicated to the coupon server to verify that the coupon is valid (518). For example, a code configured to identify a first representation the coupon may be communicated to the server to verify the validity of the coupon. Coupon information may be validated based on a variety of validation criteria. Validation criteria may include an expiration date, usage limit, eligibility of a user account for a vendor application, a quantity of uses for a user account, or any other limitation. The coupon server may determine if the coupon information is valid in response to one or more of the validation criteria (520).

Figures 6A, 6B:
FIG. 6A is an example of screen graphics displayed in response to an invalid coupon transaction.
FIG. 6B is an example of screen graphics displayed in response to a valid coupon transaction.

If the coupon information is determined to be invalid, the coupon server may notify the retailer that the coupon is invalid by communicating a message to the point of sale device from the coupon server (522). An example of a message that may be sent in response to an invalid coupon is shown in FIG. 6A. If the coupon is determined to be valid by the coupon server, the transaction may continue as illustrated in FIG. 5B. An example of a message that may be sent in response to valid coupon is shown in FIG. 6B.

Referring to FIG. 5B, the method 502 may comprise processes that may be completed in parallel or sequentially relative to reference numerals 528-540. Upon verification of valid coupon information, the point of sale device may display a translated barcode on a screen (528). The translated barcode may be in the form of a linear barcode or any format that is selected by a retail location. For example, a point of sale device may be operable to generate a translated barcode in a format requested or programmed for a retail location. The translated barcode may comprise a second representation of a coupon and may further comprise a code configured to identify the coupon. The translated barcode may then be scanned by a barcode reader as part of a retail transaction (530). A cash register may decode and identify the barcode information (532). Upon scanning the coupon information, the discount may be applied to a transaction to complete a discount transaction (534).

Coupon usage information for the coupon, previously communicated to the coupon server, may be updated in the vendor coupon database (538). In response to the usage information being updated in the vendor database, the vendor coupon database may further update information in the vendor application. The updated information may then be shown in the vendor application and a user of a mobile device may be notified of the coupon usage via a message and/or alert (540). Following the retail transaction and the updating of the coupon database, the method may be complete.

FIGS. 6A and 6B illustrate examples of screen graphics displayed on a screen of a point of sale device in response to an invalid coupon transaction and a valid coupon transaction. As discussed previously, FIG. 6A illustrates an example of a message 602 that may be sent from a coupon server in response to an invalid coupon. The message 602 may be displayed on a screen of a point of sale device to communicate that the coupon is invalid 604.

FIG. 6B illustrates an example of a message 606 that may be sent from a coupon server in response to a valid coupon. The message may include a valid barcode 608 for use in the retail transaction. The message may further include information related to a number of remaining coupons 610 and a notification 612 that the coupon was accepted. The information described in reference to FIGS. 6A and 6B may allow a sales person to provide feedback to a customer during a discount retail transaction.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

In some embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a processor or a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A system for translation of a visual representation of data of a coupon on a device at a point of sale location and validation of the coupon at a remote server, the system comprising:

a scanning component operable to capture a first representation in a first format of the data of a multi-use coupon on a user's mobile device;

a screen operable to display a second representation of at least a portion of the data, wherein the first and second representations are barcodes;

a communication interface operable to communicate via a network connection to a remote server;

at least one circuit in communication with the scanning component, the screen, and the communication interface, the at least one circuit operable to:

capture the data from the first representation with the scanning component, the data including user account information and the multi-use coupon identification from the first representation;

communicate usage information of the multi-use coupon and the user account information based on the data via the communication interface;

receive verification from the remote server via the communication interface identifying whether the coupon is valid or invalid and including usage information identifying a remaining non-zero number of available uses of the multi-use coupon;

generate the second representation in a second format different from the first format of at least the portion of the data in response to identification of the coupon as valid;

generate a coupon invalidity message in response to identification of the coupon as invalid; and display the second representation of the data or the coupon invalidity message on the screen and the remaining non-zero number of available uses of the multi-use coupon; and a remote server comprising:

a communication interface in communication with the at least one circuit via the communication interface and a vendor coupon database;

the remote server operable to:

receive from the scanner component the data from the first representation of the data of the multi-use coupon, the data including usage information of the coupon and a user account associated with the multi-use coupon or the mobile device;

verify whether the multi-use coupon and user account are valid or invalid, by determining the number of uses remaining for the multi-use coupon and the status of the user account;

communicate verification of the validity of the multi-use coupon to the device when the coupon and the user account are valid including usage information identifying the remaining non-zero number of available uses of the multi-use coupon;

communicate verification of the invalidity of the multi-use coupon to the device when the coupon or the user account are invalid; and communicate usage information to the vendor coupon database to update quantity of usage of the multi-use coupon on the user account of the user of the coupon.

2. The system according to claim 1, wherein the communication interface of the device comprises a wireless communication interface.

3. A system including a device for translation of a graphical representation of data for reading by a point of sale device, the device being in communication with a remote server for validation, the system comprising:

a translation device comprising:

a 2D barcode scanner oriented to scan in a first direction operable to capture a 2D barcode of a coupon displayed on a mobile device;

a screen operable to display a 1D barcode in a second direction facing the point of sale device;

a communication interface configured to communicate with the remote server;

at least one circuit in communication with the 2D barcode scanner, the communication interface, and the screen, the at least one circuit operable to:

identify the data including user account information and a multi-use coupon identification from the 2D barcode;

transmit the data including the user account information and multi-use coupon identification from the 2D barcode through the communication interface;

receive verification from the remote server via a communication interface identifying whether the multi-use coupon is valid or invalid for the user account identified in the 2D barcode and including usage information identifying a remaining number of non-zero number of available uses of the multi-use coupon;

wait until verification of validity of the multi-use coupon is received to display the 1D bar code to the point of sale device for display in the second direction;

generate the 1D barcode in response to identification of the multi-use coupon as valid; and display the 1D barcode on the screen of the translation device for scanning by the point of sale device and display the remaining number of non-zero number of available uses of the multi-use coupon;

in response to receipt of verification of invalidity of the multi-use coupon, generate and display a message indicating the multi-use coupon is invalid to the point of sale device on the screen of the translation device in the second direction; and a remote server comprising:

a communication interface in communication with the translation device and a vendor coupon database;

the remote server operable to:

receive from the translation device the data from the first representation of the data of the multi-use coupon, the data including usage information of the coupon and a user account associated with the multi-use coupon;

verify validity of the multi-use coupon and the user account;

communicate verification of the validity of the multi-use coupon to the translation device when the coupon and the user account are valid including usage information identifying the remaining number of non-zero number of available uses of the multi-use coupon;

communicate verification of the invalidity of the multi-use coupon to the device when the multi-use coupon or the user account are invalid; and communicate usage information to the vendor coupon database to update usage of the multi-use coupon on the user account of the user of the coupon.

4. The system according to claim 3, wherein the translation device further comprises GPS signal processing to determine a store location with the device and wherein the at least one circuit transmits the store location to the remote server.

5. The system according to claim 3, wherein the communication interface is configured to communicate with the remote server over an internet connection.

6. The system according to claim 4, wherein the remote server identifies the store location and communicates to the device information to generate the 1D barcode configured for the specific store location or particular retail chain at the store location.

7. The system according to claim 1, wherein the user account is further accessible by an application configured to operate on the mobile device; and the application is configured to authenticate the user account and provide age verification before the multi-use coupon is made available on the mobile device.

8. The system according to claim 3, wherein the user account is further accessible by an application configured to operate on the mobile device; and the application is configured to authenticate the user account and provide age verification before the multi-use coupon is made available on the mobile device.

* * * * *